United States Patent [19]

Oishi

[11] Patent Number: 4,779,160
[45] Date of Patent: Oct. 18, 1988

[54] MAGNETIC RECORDING DISK

[75] Inventor: Kengo Oishi, Odawara, Japan

[73] Assignee: Fuji Photo Film Co., Ltd., Japan

[21] Appl. No.: 918,912

[22] Filed: Oct. 15, 1986

[30] Foreign Application Priority Data

Oct. 18, 1985 [JP] Japan .......................... 60-159768[U]

[51] Int. Cl.⁴ .............................................. G11B 5/82
[52] U.S. Cl. .................................................... 360/135
[58] Field of Search .................................. 360/135,133

[56] References Cited

U.S. PATENT DOCUMENTS 3,462,817  8/1969  Horsfall ......................... 360/135 X
4,631,609 12/1986  Erickson .............................. 360/135

FOREIGN PATENT DOCUMENTS 1005103  9/1965  United Kingdom ................ 360/135

Primary Examiner—A. J. Heinz
Attorney, Agent, or Firm—Pasquale A. Razzano

[57] ABSTRACT

A magnetic recording disk comprises a disk base which is provided with a central opening and an annular recess formed on at least one side thereof between the inner peripheral edge portion surrounding the central opening and the outer peripheral edge portion along the outer periphery of the disk base, and a flexible magnetic sheet which has a shape conforming to the shape of the disk base and is bonded to the disk base over the annular recess along the inner peripheral edge portion and the outer peripheral edge portion. The thickness of the portion of the disk base corresponding to the annular recess is larger at the outer part than at the inner part.

4 Claims, 2 Drawing Sheets

MAGNETIC RECORDING DISK

BACKGROUND OF THE INVENTION

1. Field of the Invention

This invention relates to a magnetic recording disk, and more particularly to a rigid magnetic recording disk formed by applying a flexible magnetic sheet to a surface of a rigid disk base.

2. Description of the Prior Art

There has been known a rigid magnetic recording disk comprising a rigid disk base of aluminum (e.g., JIS A5086) and a magnetic layer formed on a surface of the rigid disk base. The rigid magnetic recording disk is manufactured by machining the rigid disk base, polishing the surface of the machined rigid disk base, and forming a magnetic layer on the surface of the polished rigid disk base by vapor deposition, spin-coating or the like.

Generally the surface of the magnetic recording disk is preferred to be as smooth as possible in order to minimize the space between the disk surface and the magnetic head for recording and/or reproduction and to effect high density recording and reproduction. However, in the case of the rigid magnetic recording disk having an aluminum disk base, it has been very difficult to obtain a surface having a centerline average height of not larger than 0.1 $\mu$m. Further, since the disk base is rigid, it is difficult to continuously apply magnetic layers to disk bases, and manufacturing cost and steps of the disk are therefore increased.

Further, though the magnetic head must trace the magnetic layer of the disk while being spaced therefrom by a predetermined small distance during recording or reproduction, it is difficult, in the case of the rigid magnetic recording disk, to keep the small distance constant due to lack of flexibility of the disk. Further, in the case of the conventional rigid magnetic recording disk, if the magnetic head is brought into contact with the magnetic layer, surface fracture can be produced in the magnetic layer due to the rigid disk base, thereby shortening the service life of the disk. Accordingly, it is very difficult to reduce the distance between the magnetic layer and the magnetic head to further increase the recording density.

Further, the aluminum disk base itself is very expensive.

Thus, there has been proposed a magnetic recording disk comprising a rigid disk base 51 provided with a recess 54 on each side thereof and a floppy disk or a flexible disk 52 bearing a magnetic layer on one side thereof is applied to each side of the rigid disk base 51 over the recess 54 so that a space 53 is formed between the disk base 51 and each flexible disk 52 as shown in FIG. 4.

In the magnetic recording disk of this type, surface fracture of the magnetic layer is less apt to be produced if the magnetic head is accidentally brought into contact therewith or the magnetic head is brought into contact therewith in order to increase the recording density. Further, since the art of the flexible disk can be applied as it is, and the magnetic layer of the flexible disk which has a high durability and a smooth surface can be used as the magnetic layer, the problems inherent to the conventional rigid magnetic recording disks as described above can be avoided.

In the magnetic recording disk of this type, the manufacturing accuracy of the disk base need not be so high, and accordingly the disk base may be formed by injection molding in order to reduce the manufacturing cost. Further, by increasing the depth of the recesses in the disk base, the amount of material can be reduced, thereby further reducing the manufacturing cost. However, the magnetic recording disk is rotated at a high speed (e.g., 3600 rpm) during recording or reproduction, and it is required to keep constant the rotational speed of the disk in order to obtain high recording accuracy and high reading accuracy. In order to keep constant the rotational speed of the disk, it is preferred that the rotational inertia energy of the disk be as large as possible. That is, in order to reduce the manufacturing cost, the recess in the disk base is preferably deep, and on the other hand, in order to keep constant the rotational speed of the disk, the recess in the disk base is preferably shallow so that the mass of the disk base is increased.

SUMMARY OF THE INVENTION

In view of the foregoing observations and description, the primary object of the present invention is to provide a rigid magnetic recording disk in which the amount of material of the disk base can be reduced without substantially reducing the rotational inertia energy of the disk.

In accordance with the present invention, there is provided a magnetic recording disk comprising a disk base which is provided with a central opening and an annular recess formed on at least one side thereof between the inner peripheral edge portion surrounding the central opening and the outer peripheral edge portion along the outer periphery of the disk base, and a flexible magnetic sheet which has a shape conforming to the shape of the disk base and is bonded to the disk base over the annular recess along the inner peripheral edge portion and the outer peripheral edge portion, characterized in that the thickness of the portion of the disk base corresponding to the annular recess is larger at the outer part than at the inner part.

Since the inertia energy of a rotating body increases in proportion to the distance from the rotational axis to the 4th power, the amount of material of the disk base can be reduced without substantially reducing the rotational inertia energy of the disk by making the thickness of the disk base larger at the outer part than at the inner part. That is, reduction in the thickness of the disk base at the inner part does not substantially affect the inertia energy of the disk base.

DESCRIPTION OF THE PREFERRED EMBODIMENTS

Figure 1:
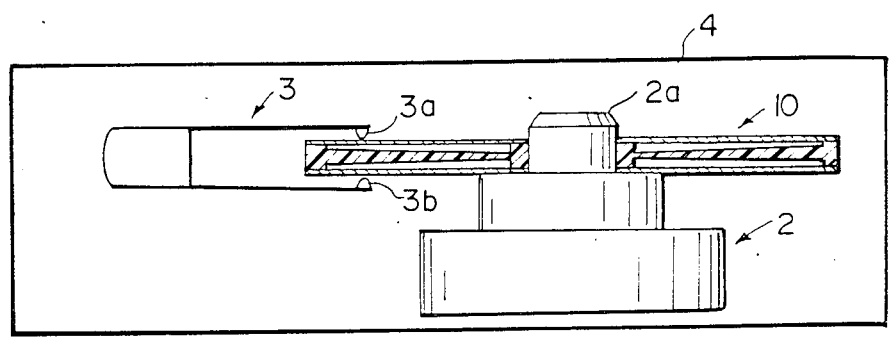
FIG. 1 is a cross-sectional view showing a magnetic recording disk in accordance with an embodiment of the present invention loaded in a recording/reproducing system.
Figure 4:
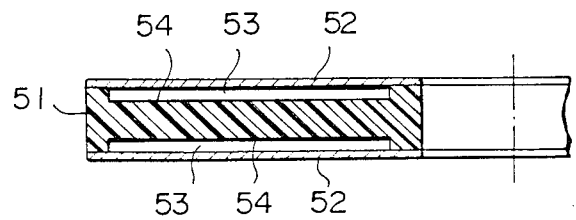
FIG. 4 is a fragmentary cross-sectional view, similar to FIG. 3A, but of a prior art magnetic recording disk.

In FIG. 1, a disk driving mechanism 2 and a recording/reproducing mechanism 3 are housed in a casing 4. The disk driving mechanism 2 has a driving shaft 2a and a magnetic recording disk 10 in accordance with an embodiment of the present invention is brought into engagement with the driving shaft 2a. A pair of magnetic heads 3a and 3b are opposed to respective sides of the magnetic recording disk 10 while the magnetic recording disk 10 is rotated at a high speed, e.g., 3600 rpm, and the magnetic heads 3a and 3b trace the respective sides of the magnetic recording disk 10 for recording or reproduction with the magnetic heads 3a and 3b being spaced from the sides of the magnetic recording disk 10 by a small distance, e.g., 0.05 to 0.15 μm, by virtue of air flow generated by rotation of the disk 10.

Figure 2A:
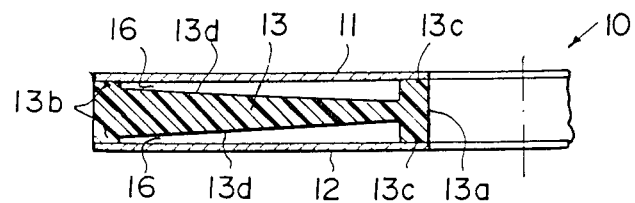
FIG. 2A is a fragmentary cross-sectional view of the magnetic recording disk of FIG. 1.
Figure 2B:
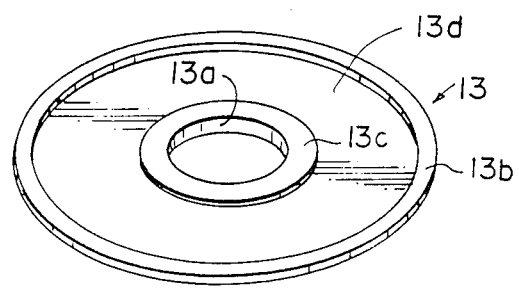
FIG. 2B is a perspective view of the disk base employed in the magnetic recording disk of FIG. 1.

As shown in FIGS. 2A and 2B, the magnetic recording disk 10 of this embodiment comprises a disk base 13 having a central opening 13a of a predetermined diameter, and a pair of flexible magnetic sheets 11 and 12 applied to the respective sides of the disk base 13.

Each of the flexible magnetic sheets 11 and 12 comprises a base sheet and a magnetic layer formed on one side of the base sheet, and may be of materials conventionally used for floppy disks. As the base sheet, a plastic film such as of polyethylene terephthalate can be used with biaxially oriented polyethylene terephthalate film (PET) being preferred. Biaxially oriented polyethylene terephthalate film exhibiting a shrinkage factor not larger than 0.2% and a longitudinal shrinkage factor not larger than 0.1%, more preferably not larger than 0.05%, as measured after heat treatment at about 70° C. for 48 hours with a magnetic layer formed thereon is particularly preferred Further, it is preferred that the centerline average height Ra of the surface of the base sheet on which the magnetic layer is to be formed be not larger than 0.1 μm in order to increase the recording density of the magnetic recording disk to be obtained.

The magnetic layer may be formed by coating magnetic iron oxide or ferromagnetic iron oxide together with a binder, or may be formed by a vapor deposition process such as vacuum deposition, sputtering, ion plating and the like, or by plating.

The disk base 13 may be formed of metal such as aluminum, aluminum alloys and the like, glass, synthetic resin, filled synthetic resin or a combination of these materials. Since the flexible magnetic sheets 11 and 12 are applied to the disk base 13, the surface roughness requirement of the disk base 13 is not so severe and accordingly, even if the disk base 13 is formed of aluminum, the cost of polishing the surface and the like is not so high. When the disk base 13 is formed of synthetic resin or filled synthetic resin, the disk base 13 can be mass-produced by injection molding, thereby reducing the manufacturing cost.

Typically, the thickness of the disk base 13 is from 1 mm to 5 mm, and the thickness of the flexible magnetic sheet 11 and 12 is from 10 μm to 100 μm. Since the dimensional stability of the magnetic recording disk 10 mainly depends upon the dimensional stability of the disk base 13, it is preferred that the disk base 13 has an excellent dimensional stability. Further, since the arm supporting the magnetic heads 3a and 3b is generally formed of aluminum, the thermal expansion coefficient of the disk base 13 is preferably approximate to that of the aluminum ($2.4 \times 10^{-5}/°$ C.), and the moisture absorption expansion coefficient of the disk base 13 is preferably as small as possible.

The disk base 13 is provided with an annular recess 13d formed on each side thereof between the inner peripheral edge portion 13c surrounding the central opening 13a and the outer peripheral edge portion 13b along the outer periphery of the disk base 13. The flexible magnetic sheets 11 and 12 are positioned to cover the respective recesses 13d and bonded to the disk base 13 along the outer peripheral edge portions 13b and the inner peripheral edge portions 13c by suitable adhesive such as thermosetting adhesive, or radiation-curing adhesive, e.g., electron-ray-curing adhesive, or ultraviolet-curing ahesive. Thus a space 16 is formed between the disk base 13 and each of the flexible magnetic sheets 11 and 12.

By virtue of the space 16, the surface of each flexible magnetic sheet can be flexible so that friction force between the magnetic head and the magnetic layer is dispersed when the magnetic head is brought into contact with the surface of the flexible magnetic sheet, thereby increasing the durability of the magnetic recording disk 10. Accordingly, the space between the magnetic head and the magnetic layer can be substantially minimized to increase the recording density. In this regard, it is preferred that the depth of the recess 13d be not smaller than 0.1 mm. Further, it has been found that the influence of dusts deposited on the magnetic layer is moderated by virtue of the space 16.

As clearly shown in FIG. 2A, the disk base 13 is tapered in cross section from the outer peripheral edge portion 13b toward the inner peripheral edge portion 13c so that the thickness of the disk base 13 is reduced toward the center or the rotational axis of the magnetic recording disk 10. As described above, since the inertia energy of a rotating body is increased in proportion to the distance from the rotational axis to the 4th power, the amount of material of the disk base 13 can be reduced without substantially reducing the rotational inertia energy of the disk by making the thickness of the disk base 13 larger at the outer part than at the inner part.

Figure 3A:
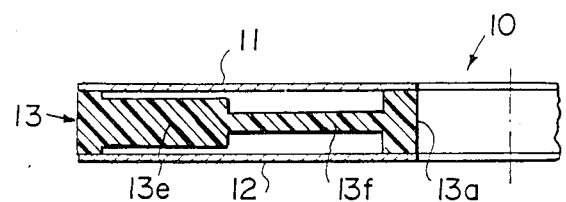
FIG. 3A is a fragmentary cross-sectional view of a magnetic recording disk in accordance with another embodiment of the present invention.
Figure 3B:
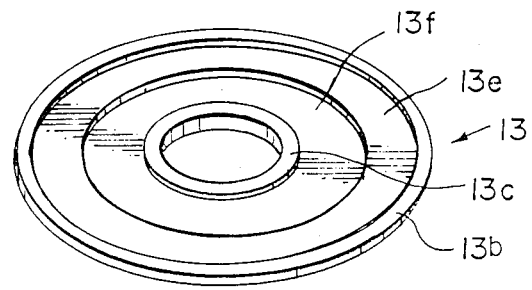
FIG. 3B is a view of the disk base employed in the magnetic recording disk of FIG. 3A.

Though the thickness of the disk base 13 is continuously reduced toward the center of the disk base 13 in the embodiment described above, the thickness of the disk base 13 may be changed stepwise by forming a large thickness portion 13e on the outer part and a small thickness portion 13f on the inner part as shown in FIGS. 3A and 3B.

Further, though in the embodiments described above, the disk base 13 is provided with recesses symmetrically formed on the respective sides thereof and the flexible magnetic sheets 11 and 12 are applied to the sides of the disk base 13, the disk base 13 may be provided with a recess only on one side thereof and only one flexible magnetic sheet may be applied on the side provided with the recess.

I claim:

1. A magnetic recording disk comprising a disk base having a central opening bounded by an inner peripheral edge portion having a corresponding first thickness, an outer peripheral edge portion having a corresponding first thickness, and an annular recess formed on at least one side of said base between said inner peripheral edge portion and said outer peripheral edge porton an a flexible magnetic sheet having inner and outer peripheral edge portions respectively bonded to the disk base along the inner and the outer peripheral edge portions of the base with said sheet extending over said annular recess between said inner and outer peripheral edge portions, said base having a thickness in the portion of the disk base corresponding to the annular recess which is larger at the outer portion of the base adjacent said outer peripheral edge portion than at the inner portion of the base adjacent said inner peripheral edge portion of the base, said disk base being continuously tapered in cross section from the outer peripheral edge portion toward the inner peripheral edge portion.

2. A magnetic recording disk as defined in claim 1 in which said annular rcess is formed on each side of the disk base and the flexible magnetic sheet is bonded to the disk base on each side thereof.

3. A magnetic recording disk as defined in claim 2 in which said annular recesses on the respective sides of the disk base is symmetrically formed.

4. A magnetic recording disk as defined in claim 3 in which the disk base is tapered in cross section from the outer peripheral edge portion toward the inner peripheral edge portion.

* * * * *